United States Patent
Kato et al.

(10) Patent No.: US 6,539,329 B2
(45) Date of Patent: Mar. 25, 2003

(54) APPARATUS FOR DETECTING ROTATIONAL ANGLE BY EMPLOYING TWO OR MORE DETECTION SIGNALS BASED ON ROTATIONAL ANGLE AND ROTATIONAL DIRECTION OF ROTATING MEMBER

(75) Inventors: Hironori Kato, Miyagi-ken (JP); Yoshio Sanpei, Miyagi-ken (JP); Toshiyuki Hoshi, Miyagi-ken (JP); Hirofumi Okumura, Miyagi-ken (JP); Ichiro Tokunaga, Miyagi-ken (JP); Toshio Ogawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/790,843

(22) Filed: Feb. 22, 2001

(65) Prior Publication Data

US 2001/0020832 A1 Sep. 13, 2001

(30) Foreign Application Priority Data

Feb. 25, 2000 (JP) ........................ 2000-049990

(51) Int. Cl.$^7$ .............................. H02P 7/00; B26D 5/06
(52) U.S. Cl. ...................... 702/151; 73/118.1; 318/432; 180/415; 701/48; 324/207.21; 342/442
(58) Field of Search ............... 701/34, 41, 48, 701/101; 702/151, 153; 324/165, 207.16, 207.21, 207.25; 318/102, 432; 180/415, 443; 33/366.14, 438; 73/118.1

(56) References Cited

U.S. PATENT DOCUMENTS

| | | | | |
|---|---|---|---|---|
| 4,768,602 A | * | 9/1988 | Inoue et al. | 180/415 |
| 4,874,053 A | * | 10/1989 | Kimura et al. | 180/79.1 |
| 5,012,673 A | * | 5/1991 | Takano et al. | 73/118.1 |
| 5,410,477 A | * | 4/1995 | Ishii et al. | 701/48 |
| 5,656,936 A | | 8/1997 | Ao et al. | 324/207.21 |
| 6,018,318 A | | 1/2000 | Schödlbauer | 342/442 |
| 6,049,182 A | * | 4/2000 | Nakatani et al. | 318/432 |

FOREIGN PATENT DOCUMENTS

| | | |
|---|---|---|
| DE | 195 48 385 A1 | 3/1997 |
| DE | 197 39 823 A1 | 3/1999 |
| EP | 0 856 720 A1 | 8/1998 |

* cited by examiner

Primary Examiner—John Barlow
Assistant Examiner—John Le
(74) Attorney, Agent, or Firm—Brinks Hofer Gilson & Lione

(57) ABSTRACT

A rotational angle detecting apparatus having a rotation detector that outputs, as a rotor coupled to a rotating member rotates, first and second detection signals, which have predetermined amplitudes, the same cycle, and a phase difference of a quarter wavelength, a memory for storing the first and second detection signals, and a control unit. The control unit detects the rotational angle of the rotating member by averaging the amplitudes of the first and second detection signals according to the area in which the first detection signal lies.

4 Claims, 8 Drawing Sheets

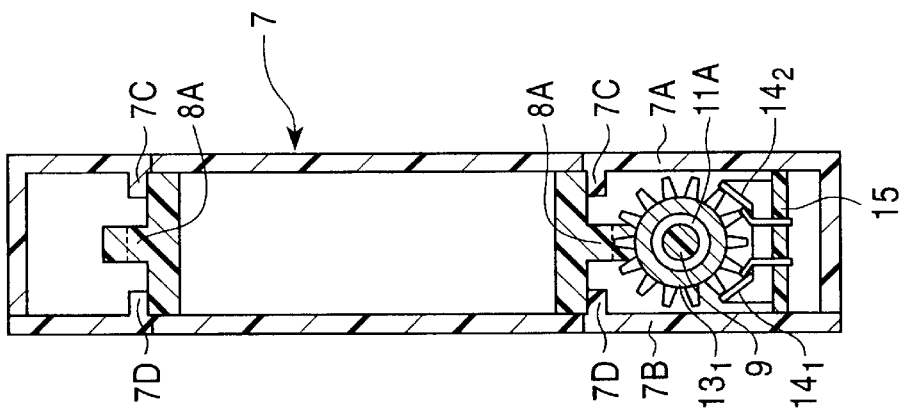
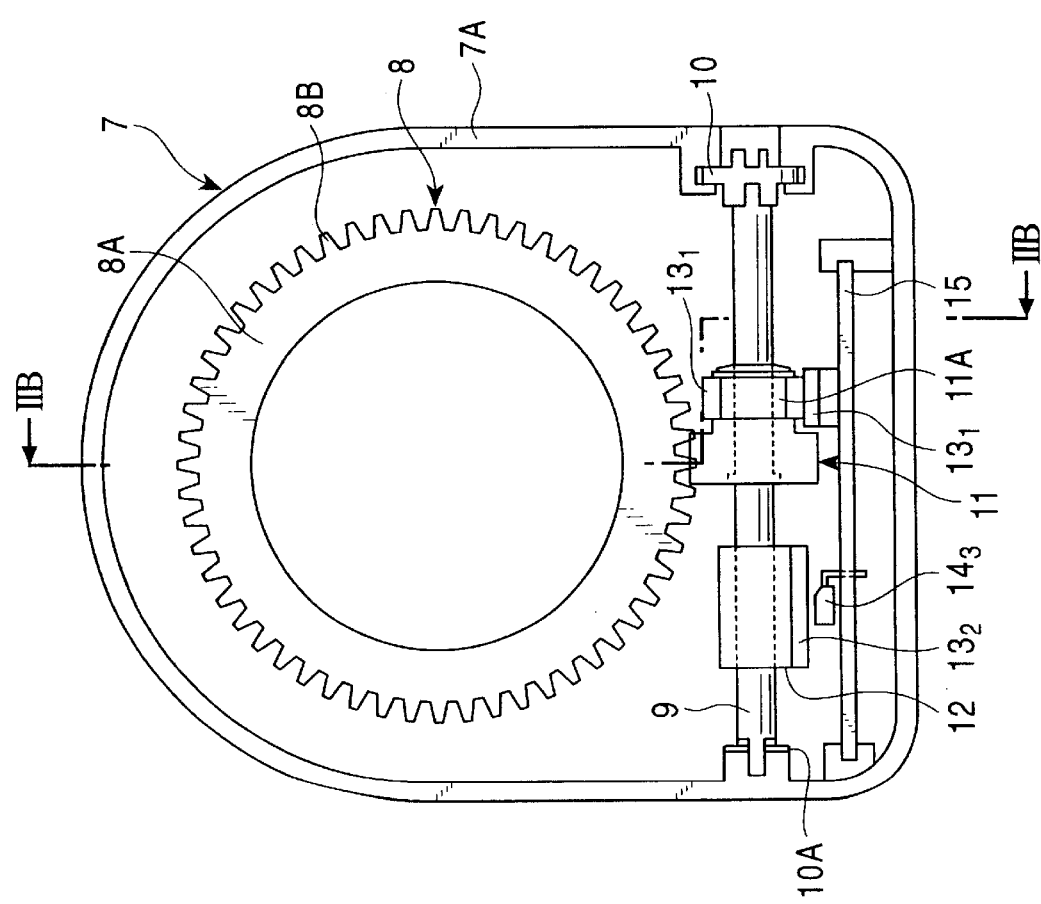

FIG. 6

| sinθ (a-phase) | | | cosθ (b-phase) | | |
|---|---|---|---|---|---|
| VOLTAGE VALUE | ANGLE VALUE | TILT (DIFFERENTIAL VALUE) | VOLTAGE VALUE | ANGLE VALUE | TILT (DIFFERENTIAL VALUE) |
| ○ 2.5000 | 0.0 | 1.0000 | 0.5000 | 0.0 | 0.0000 |
| 2.5872 | 2.5 | 0.9990 | 0.5019 | 2.5 | 0.0436 |
| 2.6743 | 5.0 | 0.9962 | 0.5076 | 5.0 | 0.0872 |
| 2.7611 | 7.5 | 0.9914 | 0.5171 | 7.5 | 0.1305 |
| 2.8473 | 10.0 | 0.9848 | 0.5304 | 10.0 | 0.1736 |
| 2.9329 | 12.5 | 0.9763 | 0.5474 | 12.5 | 0.2164 |
| 3.0176 | 15.0 | 0.9659 | 0.5681 | 15.0 | 0.2588 |
| 3.1014 | 17.5 | 0.9537 | 0.5926 | 17.5 | 0.3007 |
| 3.1840 | 20.0 | 0.9397 | 0.6206 | 20.0 | 0.3420 |
| 3.2654 | 22.5 | 0.9239 | 0.6522 | 22.5 | 0.3827 |
| 3.3452 | 25.0 | 0.9063 | 0.6874 | 25.0 | 0.4226 |
| 3.4235 | 27.5 | 0.8870 | 0.7260 | 27.5 | 0.4617 |
| 3.5000 | 30.0 | 0.8660 | 0.7679 | 30.0 | 0.5000 |
| 3.5746 | 32.5 | 0.8434 | 0.8132 | 32.5 | 0.5373 |
| 3.6472 | 35.0 | 0.8192 | 0.8617 | 35.0 | 0.5736 |
| 3.7175 | 37.5 | 0.7934 | 0.9133 | 37.5 | 0.6088 |
| 3.7856 | 40.0 | 0.7660 | 0.9679 | 40.0 | 0.6428 |
| 3.8512 | 42.5 | 0.7373 | 1.0254 | 42.5 | 0.6756 |
| ∞ 3.9142 | 45.0 | 0.7071 | 1.0858 | 45.0 | 0.7071 |
| 3.9746 | 47.5 | 0.6756 | 1.1488 | 47.5 | 0.7373 |
| 4.0321 | 50.0 | 0.6428 | 1.2144 | 50.0 | 0.7660 |
| 4.0867 | 52.5 | 0.6088 | 1.2825 | 52.5 | 0.7934 |
| 4.1383 | 55.0 | 0.5736 | 1.3528 | 55.0 | 0.8192 |
| 4.1868 | 57.5 | 0.5373 | 1.4254 | 57.5 | 0.8434 |
| 4.2321 | 60.0 | 0.5000 | 1.5000 | 60.0 | 0.8660 |
| 4.2740 | 62.5 | 0.4617 | 1.5765 | 62.5 | 0.8870 |
| 4.3126 | 65.0 | 0.4226 | 1.6548 | 65.0 | 0.9063 |
| 4.3478 | 67.5 | 0.3827 | 1.7346 | 67.5 | 0.9239 |
| 4.3794 | 70.0 | 0.3420 | 1.8160 | 70.0 | 0.9397 |
| 4.4074 | 72.5 | 0.3007 | 1.8986 | 72.5 | 0.9537 |
| 4.4319 | 75.0 | 0.2588 | 1.9824 | 75.0 | 0.9659 |
| 4.4526 | 77.5 | 0.2164 | 2.0671 | 77.5 | 0.9763 |
| 4.4696 | 80.0 | 0.1736 | 2.1527 | 80.0 | 0.9848 |
| 4.4829 | 82.5 | 0.1305 | 2.2389 | 82.5 | 0.9914 |
| 4.4924 | 85.0 | 0.0872 | 2.3257 | 85.0 | 0.9962 |
| 4.4981 | 87.5 | 0.0436 | 2.4128 | 87.5 | 0.9990 |
| ∞ 4.5000 | 90.0 | 0.0000 | 2.2000 | 90.0 | 1.0000 |

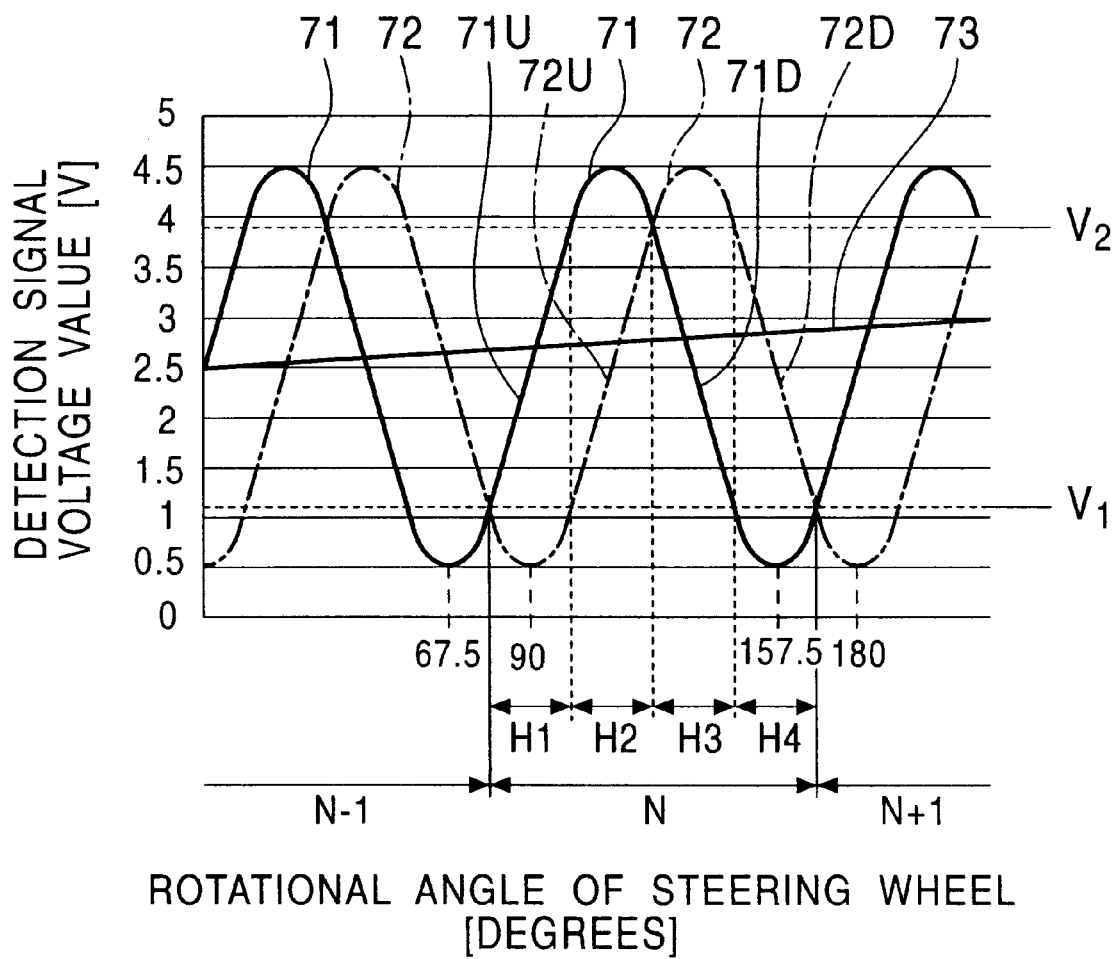

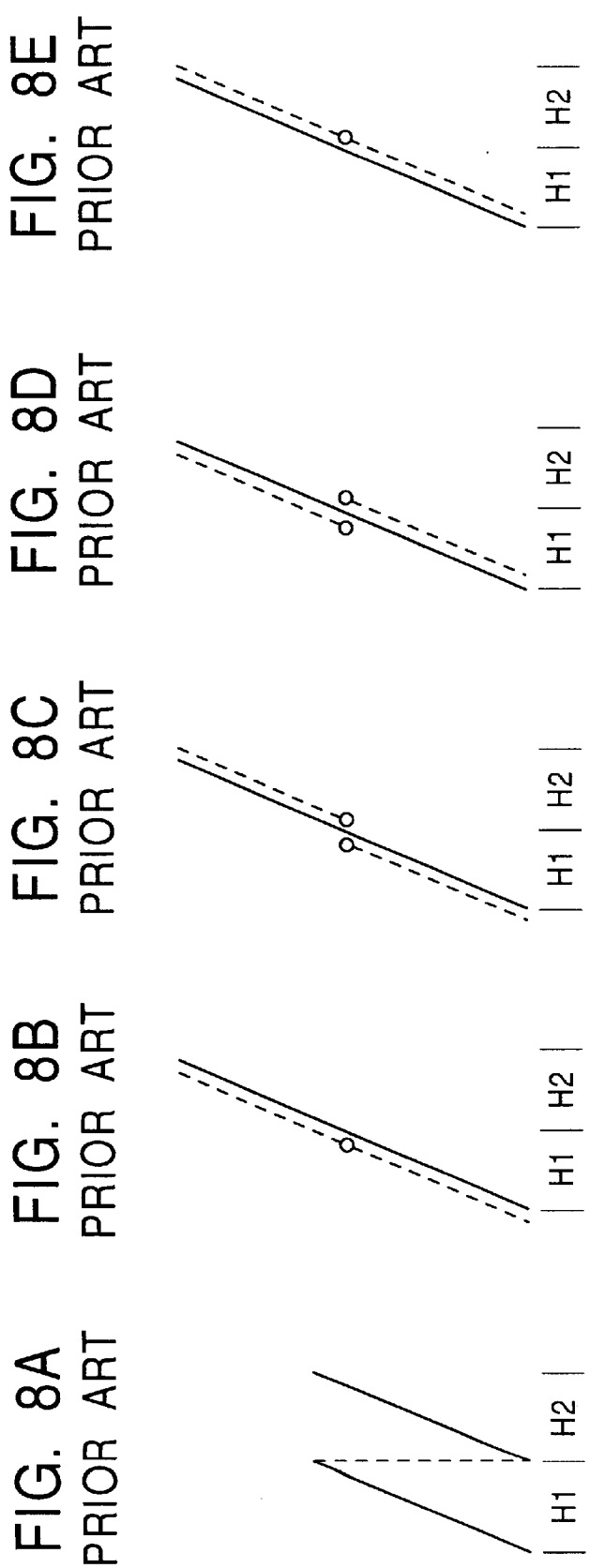

APPARATUS FOR DETECTING ROTATIONAL ANGLE BY EMPLOYING TWO OR MORE DETECTION SIGNALS BASED ON ROTATIONAL ANGLE AND ROTATIONAL DIRECTION OF ROTATING MEMBER

BACKGROUND OF THE INVENTION

1. Field of the Invention

The present invention relates to a rotational angle detecting apparatus and, more particularly, to a rotational angle detecting apparatus coupled to a rotating member, such as an automotive-steering shaft, to cause two or more detection signals, which are based on the rotational angle and the rotational direction of a steering wheel, to be output so as to detect the rotational angle of the rotating member by employing the detection signals.

2. Description of the Related Art

In a conventional rotational angle detecting apparatus, a rotation detector employs a rotary sensor. As an example of the rotary sensor, the following rotary sensor will be described (this rotary sensor will be hereinafter referred to as "the conventional rotary sensor").

The proposed rotary sensor is constructed by a fixed base member, a rotor rotatable with respect to the base member, and a rotation detector that outputs a first sinusoidal detection signal and a second sinusoidal detection signal that are disposed between the base member and the rotor, and have a predetermined amplitude, the same cycle, and a phase difference of a quarter wavelength, and a third detection signal that maintains the same cycle over the whole rotational range of the rotor, and linearly increases in voltage value. During an operation, the rotor is coupled to a rotating member, e.g., an automotive steering shaft. In this case, the rotation detector is constituted by a first magnet and a second magnet disposed on the base member, a first Hall element and a second Hall element disposed such that they oppose the first magnet and are arranged with an angle of approximately 90 degrees, and a third Hall element disposed to oppose the second magnet, the three Hall elements being provided in the rotor.

In such a construction, when the steering wheel is turned to rotate the steering shaft connected thereto, the rotor coupled to the steering shaft rotates. This causes the rotation detector to generate the first detection signal, the second detection signal, and the third detection signal based on the rotational angle and the rotational direction of the steering shaft.

The first detection signal, the second detection signal, and the third detection signal that have been generated are supplied to a control unit mounted on a car. Based on the supplied third detection signal, the control unit detects a coarse rotational angle and the rotational direction of the steering wheel or the steering shaft from a neutral position. Based on the first detection signal and the second detection signal that have been supplied, the control unit further detects the fine rotational angle of the steering wheel or the steering shaft from the neutral position. The detected rotational angle and the rotational direction of the steering wheel or the steering shaft from the neutral position are supplied as detection information to a controller. Based on the supplied detection information, the controller decides on and detailedly carries out suspension control or traction control of the car.

FIG. 7 is a characteristic chart illustrating the relationship between the rotational angle of the steering wheel and the output voltages of the first detection signal, the second detection signal, and the third detection signal.

Referring to FIG. 7, reference numeral 71 denotes the first detection signal, reference numeral 72 denotes the second detection signal, and reference numeral 73 denotes the third detection signal. The chart illustrates the changes in the output voltages of the first through third detection signal 71 through 73 in the range of the rotational angle from 0 degrees to +225 degrees with respect to the rotational angle 0 degrees (neutral position) of the steering wheel.

In this case, the first detection signal 71 and the second detection signal 72 are composed of sine waves that share the same amplitude and the same cycle but are different in wavelength phase by a quarter. The voltage values of both the first detection signal 71 and the second detection signal 72 are 4.5 V at a maximum amplitude, and 0.5 V at a minimum amplitude. The first detection signal 71 reaches its minimum amplitude (voltage value: 0.5 V) at the rotational angles of +67.5 degrees and +157.5 degrees. The second detection signal 72 reaches its minimum amplitude (voltage value: 0.5 V) at the rotational angles of 0 degrees, +90.0 degrees, and +180.0 degrees. The voltage value of the third detection signal 73 linearly increases until the rotational angle reaches +225 degrees from zero degrees. The voltage value is 2.5 V when the rotational angle is zero degrees, and 3.0 V when the rotational angle is +180 degrees.

Referring to the characteristic chart shown in FIG. 7, the operation for detecting the rotational angle and the rotational direction of the steering wheel that is performed in the control unit will be described.

First, the control unit detects the direction in which the steering wheel is rotating with respect to the neutral position (rotational angle: 0 degrees) by means of the voltage value of the third detection signal 73 that has been supplied. More specifically, if the voltage value of the third detection signal 73 exceeds 2.5 V, then the control unit detects that the steering wheel is rotating in one direction, namely, the direction of a positive rotational angle. If the voltage value of the third detection signal 73 is below 2.5 V, then the control unit detects that the steering wheel is rotating in the other direction, namely, in the direction of a negative rotational angle.

Next, as shown in FIG. 7, the overall rotational angle of the steering wheel, e.g., 1440 degrees (±720 degrees), is divided into sections of angles (e.g. 90 degrees), each of which being equivalent to one wavelength of the first detection signal 71 and the second detection signal 72, . . . , N−1, N, N+1, . . . , thereby making it possible to detect, based on the voltage values of the supplied third detection signal 73, the coarse rotational angles that indicate the correspondence between the rotational angles of the steering wheel and the sections of angles. For example, if the control unit detects 2.8 V as the voltage value of the third detection signal 73, then an angle segment N is detected as the one that corresponds to the voltage value.

Subsequently, the control unit determines a first voltage value $V_1$ and a second voltage value $V_2$ at which the voltage values of the supplied first detection signal 71 and the second detection signal 72 agree in the detected angle segment N. The control unit then employs the determined first voltage value $V_1$ and second voltage value $V_2$ to identify one detection signal lying outside the range of the first voltage value $V_1$ and the second voltage value $V_2$ and the other detection signal lying within the range of the first voltage value $V_1$ and the second voltage value $V_2$.

The control unit then determines whether the other detection signal lying within the range of the first voltage value $V_1$ and the second voltage value $V_2$ is the first detection signal 71 or the second detection signal 72. At the same time, the control unit determines whether the one detection signal lying outside the range of the first voltage value $V_1$ and the second voltage value $V_2$ is smaller than the first voltage value $V_1$ or larger than the second voltage value $V_2$. The control unit further determines whether the other detection signal lying within the range of the first voltage $V_1$ and the second voltage value $V_2$ lies in a first divided angle segment H1, a second divided angle segment H2, a third divided angle segment H3, or a fourth divided angle segment H4 (angle segments H1 through H4 are formed by dividing the single angle section N into four segments). Thus, the fine rotational angle of the steering wheel is detected by determining in which of the divided angle segments H1 through H4 in the single angle segment N the other detection signal lies.

In this case, the other detection signal lying within the range of the first voltage value $V_1$ and the second voltage value $V_2$ will have the first angle segment H1 providing a linear rise (tilt or slope) portion 71U of the first detection signal 71, the second angle segment H2 providing a linear rise (tilt or slope) portion 72U of the second detection signal 72, the third angle segment H3 providing a linear fall (tilt or slope) portion 71D of the first detection signal 71, and the fourth angle segment H4 providing a linear fall (tilt or slope) portion 72D of the second detection signal 72.

In the rotational angle detecting apparatus having the conventional rotary sensor or the rotation detector set forth above, the first detection signal, the second detection signal, and the third detection signal are output from the rotation detector as the rotating member or the rotor rotates. To detect the rotational angle and the rotational direction of the rotating member on the basis of the supplied first through third detection signals, the control unit detects the rotational direction and the coarse rotational-angle of the rotating member on the basis of the amplitude or the voltage value of the third detection signal, and also detects the fine rotational angle of the rotating member on the basis of the linear slope portions of the first and second detection signals. Hence, the rotational direction and the rotational angle of the rotating member can be detected with high accuracy over a wide range.

However, in the rotational angle detecting apparatus equipped with the conventional rotary sensor or the rotation detector, the control unit uses the linear slope portions 71U, 71D, 72U, and 72D of the first and second detection signals in the first angle segment H1 through the fourth angle segment H4 to detect the fine rotational angle of the rotating member. Therefore, when the fine rotational angle to be detected is shifted from one angle segment (e.g. the first angle segment H1) to another angle segment (e.g. the second angle segment H2), the continuity of the amplitude between the preceding linear slope portion (e.g. 71U) and the following linear slope portion (e.g. 72U) breaks at the shifting point.

In general, if the preceding linear slope portion 71U and the following linear slope portion 72U do not include a rotational angle detection error, then the rotational angle detection value based on the preceding linear slope portion 71U and the following linear slope portion 72U will not include an error.

However, the linear slope portions usually include small rotational angle detection errors, and the rotational angle detection values temporarily vary, depending on the error direction of the rotational angle detection errors, when shifting between the preceding linear slope portion 71U and the following linear slope portion 72U.

FIGS. 8A–8E are schematic representations showing the changes in the rotational angle detection values in relation to the changes in the amplitude of the linear slope portions, which are observed when a shift is made from one angle segment to another angle segment. The schematic representation illustrates cases where the error directions of the rotational angle detection errors in the linear slope portions are different.

Referring to FIG. 8A, when the fine rotational angle to be detected shifts from the first angle segment H1 to the second angle segment H2, and from the linear slope portion 71U to the linear slope portion 72U, if there is a rotational angle detection error of −0.8% in the linear slope portion 71U and there is the same rotational angle detection error of −0.8% in the linear slope portion 72U, as shown in FIG. 8B, or if there is a rotational angle detection error of +0.8% in the linear slope portion 71U and there is the same rotational angle detection error of +0.8% in the linear slope portion 72U, as shown in FIG. 8E, then the rotational angle detection values obtained when the shift from the linear tilt 71U to the linear tilt 72U takes place will be successive rotational angle detection values that include the same −0.8% or +0.8%. Hence, the rotational angle detection values do not indicate temporary changes at shifts.

As shown in FIG. 8C, however, if the linear slope portion 71U includes a rotational angle detection error of −0.8% and the linear slope portion 72U includes a rotational angle detection error of +0.8%, or the linear slope portion 71U includes a rotational angle detection error of +0.8% and the linear slope portion 72U includes a rotational angle detection error of −0.8%, then the errors will be added to the rotational angle detection values when a shift from the linear slope portion 71U to the linear slope portion 72U takes place. As a result, at a shift, the rotational angle detection value will change (increase or decrease) by the rotational angle detection error of +1.6% or the rotational angle detection error of −1.6%.

Thus, according to the rotational angle detecting apparatus having the conventional rotary sensor or rotation detector, when the control unit detects a fine rotational angle, a slight change may occur in a rotational angle detection value due to the rotational angle detection errors in the linear slope portions 71U, 71D, 72U, and 72D, causing the accuracy of the rotational angle detection to deteriorate accordingly.

SUMMARY OF THE INVENTION

The present invention has been made with a view toward solving the aforesaid problem, and it is an object of the present invention to provide a rotational angle detecting apparatus that reduces the influence of a rotational angle detection error included in a linear slope portion when detecting a fine rotational angle, thereby permitting highly accurate rotational angle detection to be accomplished.

To this end, according to one aspect of the present invention, there is provided a rotational angle detecting apparatus including a rotor connected to a rotating member, a rotation detector for successively detecting, as the rotor rotates, a first sinusoidal detection signal and a second sinusoidal detection signal that have a predetermined amplitude, the same cycle, and a phase difference of a quarter wavelength, a memory for storing the first detection signal and the second detection signal, and a control unit, wherein the control unit changes the weighting of the first detection signal and the second detection signal according to the area of the rotational angle of the rotating member when detecting a fine rotational angle of the rotating member on the basis of the amplitudes of the first detection signal and the second detection signal.

With this arrangement, when detecting the fine rotational angle of the rotating member on the basis of the amplitudes of the first detection signal and the second detection signal, weighting is imparted to the first detection signal and the second detection signal, and the weighting is changed according to the area of the rotational angle of the rotating member such that the weighting coefficient of a detection signal having a higher degree of linearity between the detection signals is set to be larger than the weighting coefficient of a detection signal having a lower degree of linearity. Hence, by selecting appropriate weighting coefficients and rotational angle areas, rotational angle detection values can be obtained with less influences of a rotational angle detection error even if a slight rotational angle detection error is included in the linear slope portion of one detection signal or the other detection signal. This permits a rotational angle detecting apparatus with high accuracy to be achieved.

Preferably, in the construction described above, the weighting of the first detection signal and the second detection signal is decided on the basis of three areas. The three areas include a first area within the range defined by one-sixth cycle preceding and following the point at which either the first detection signal or the second detection signal reaches its mid amplitude, a second area within the range of one-twelfth cycle of one detection signal lying outside the first area, and a third area within the range of one-twelfth cycle of one detection signal lying outside the second area. Preferably, the rotational angle of a rotating member is detected on the basis of the amplitude of one detection signal when one detection signal is present in the first area, the amplitude obtained by averaging the amplitude of one detection signal and the amplitude of the other detection signal at a ratio of 7 to 3 when one detection signal is present in the second area, and the amplitude obtained by averaging the amplitude of one detection signal and the amplitude of the other detection signal at a ratio of 5 to 5 when one detection signal is present in the third area.

With this arrangement, when the control unit detects a fine rotational angle by using the first detection signal and the second detection signal output from the rotation detector, the three areas, namely, the first area, the second area, and the third area, are defined for the cycle of one detection signal. Furthermore, depending on whether one detection signal lies in the first area, the second area, or the third area, the amplitude of one detection signal and the amplitude of the other detection signal are averaged at a predetermined ratio, preferably, 10 to 0, 7 to 3, or 5 to 5 so as to determine the fine rotational angle of the rotating member by employing the obtained average values. Hence, if the linear slope portion of one detection signal or the other detection signal includes a small rotational angle detection error, a rotational angle detection value can be obtained with less influences of the rotational angle detection error, thus enabling a rotational angle detecting apparatus with high accuracy to be achieved.

In a preferred form of the present invention, the rotating member is an automotive steering shaft, and the first detection signal and the second detection signal detect the steering angle of the steering shaft in cooperation with the third detection signal indicating the coarse rotational angle of the full rotation of the steering shaft.

With this arrangement, the rotational angle of an automotive steering shaft can be detected with high accuracy, permitting a power steering mechanism with high rotation control performance to be accomplished.

Preferably, a steering angle detection signal is supplied to a controller via a local area network bus line provided in a car.

With this arrangement, detection signals can be supplied to the controller without being affected by ambient noises or the like, so that malfunction of the controller can be prevented.

BRIEF DESCRIPTION OF THE DRAWINGS

FIGS. 2A and 2B provide sectional views showing an example of a specific configuration of a rotary sensor making up a rotation detector;

FIG. 6 is a characteristic diagram showing a table of the amplitudes in terms of voltage values, angle values, and tilts in terms of differential values of the first detection signal and the second detection signal in the angle areas shown in FIG. 5;

FIG. 7 is a characteristic diagram illustrating the relationship between the rotational angles of the steering wheel and the output voltages of the first detection signal, the second detection signal, and a third detection signal; and FIGS. 8A–8E are a schematic representation showing the changes of the rotational angle detection values taking place in response to the changes in the amplitude of a linear slope portion at a shift between angle segments.

DESCRIPTION OF THE PREFERRED EMBODIMENTS

An embodiment of the present invention will now be described with reference to the accompanying drawings.

Figure 1:
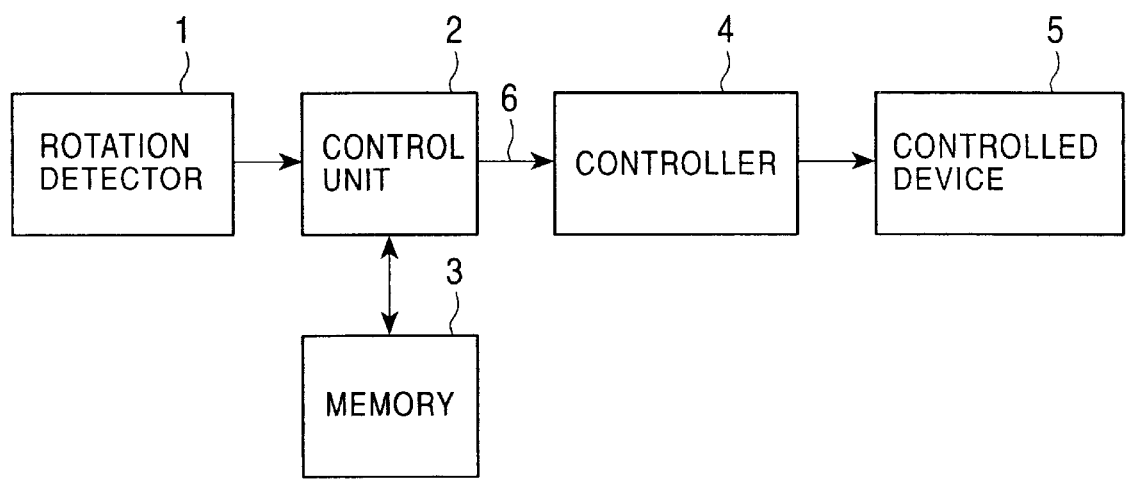
FIG. 1 is a block diagram of an essential section showing an embodiment of a rotational angle detecting apparatus in accordance with the present invention.

FIG. 1 is a block diagram of an essential section showing an embodiment of a rotational angle detecting apparatus in accordance with the present invention. The rotational angle detecting apparatus is adapted to detect the rotational angle of an automotive steering wheel.

Referring to FIG. 1, the rotational angle detecting apparatus according to the embodiment is constituted by a rotation detector 1, a control unit (microcomputer) 2, a storage (memory) 3, a controller 4, a controlled device 5, and a local area network (LAN) bus line 6. An automotive steering shaft (not shown) is connected to the rotation detector 1. The controlled device 5 is composed of an automotive suspension device or automatic transmission device.

In this embodiment, the rotation detector 1 is connected to the control unit 2. The control unit 2 is connected to the controller 4 through the LAN bus line 6 and also connected to the memory 3.

FIG. 2A is a cross-sectional view and FIG. 2B is a sectional view taken along the line 2B—2B of FIG. 2A, both views showing an example of a specific configuration of a rotary sensor making up the rotation detector 1.

As shown in FIGS. 2A and 2B, the rotary sensor has an enclosure 7, a rotor 8, a rotating shaft 9, a bearing 10, a worm gear 11, a sliding member 12, a first magnet $13_1$, a second magnet $13_2$, a first Hall element $14_1$, a second Hall element $14_2$, a third Hall element $14_3$, and a circuit board 15.

The enclosure 7 is formed of a case 7A and a cover 7B. The opening of the case 7A is covered by the cover 7B to make up the enclosure 7. An annular projection 7C is formed on the bottom portion of the case 7A, and another annular projection 7D is also formed on the inner surface of the cover 7B. The rotor 8 is drum-shaped, and secured to an automotive steering shaft (not shown) that has been inserted in the central opening of the rotor 8. A narrow protuberance 8A is formed at the center of the width of the outer periphery of the rotor 8, and a worm 8B is formed over the full periphery of the protuberance 8A. When the enclosure 7 is formed, both outer peripheral edge portions of the rotor 8 are fitted inside the annular projections 7C and 7D, and the rotor 8 is rotatably retained in the enclosure 7 such that the narrow protuberance 8A juts outward between the annular projections 7C and 7D. One end of the rotating shaft 9 is attached to the case 7A via the bearing 10, and the other end thereof is fixed to the case 7A via a corrugated washer 10A. The rotating shaft 9 has a thread groove in a peripheral portion thereof where the sliding member 12, which will be discussed hereinafter, is fitted. The worm gear 11 is fitted onto the rotating shaft 9, and meshed with a worm 8B. A cylindrical magnet holder 11A is coupled to the worm gear 11, and the first magnet $13_1$, having a cylindrical shape is fitted onto the circumference of the magnet holder 11A. In this case, the circumferential opposing portions of the first magnet $13_1$ form the north and south poles, respectively. The cylindrical sliding member 12 has a thread groove (not shown) in its inner peripheral portion in which the rotating shaft 9 is fitted. When the sliding member 12 is fitted to the rotating shaft 9, the thread grooves of the two components mesh with each other. The outer periphery of the sliding member 12 is provided with a projecting guide (not shown) fitted in a guiding groove (not shown) of the enclosure 7 to prevent the sliding member 12 from rotating with the rotating shaft 9 when the rotating shaft 9 rotates. Furthermore, the second magnet $13_2$, which is bar-shaped, is mounted in the axial direction of the rotating shaft 9. In this case, the circumferential opposing portions form the north and south poles, respectively, in the first magnet $13_1$, while one end forms the north pole and the other end forms the south pole in the second magnet $13_2$. The first Hall element $14_1$ and the second Hall element $14_2$ are mounted on a circuit board 15 such that they are close to the cylindrical first magnet $13_1$ and installed at a 90-degree angle with respect to the axis of the rotating shaft 9. The third Hall element $14_3$ is mounted on the circuit board 15 such that it is located in the vicinity of the bar-shaped second magnet $13_2$. When the enclosure 7 is formed, both ends of the circuit board 15 are retained by a circuit holder (with no reference numeral) in the enclosure 7.

In the above configuration, the enclosure 7 and the circuit board 15 make up a base member, while the rotor 8 and the rotating shaft 9, etc. make up the rotor assembly.

Figure 3:
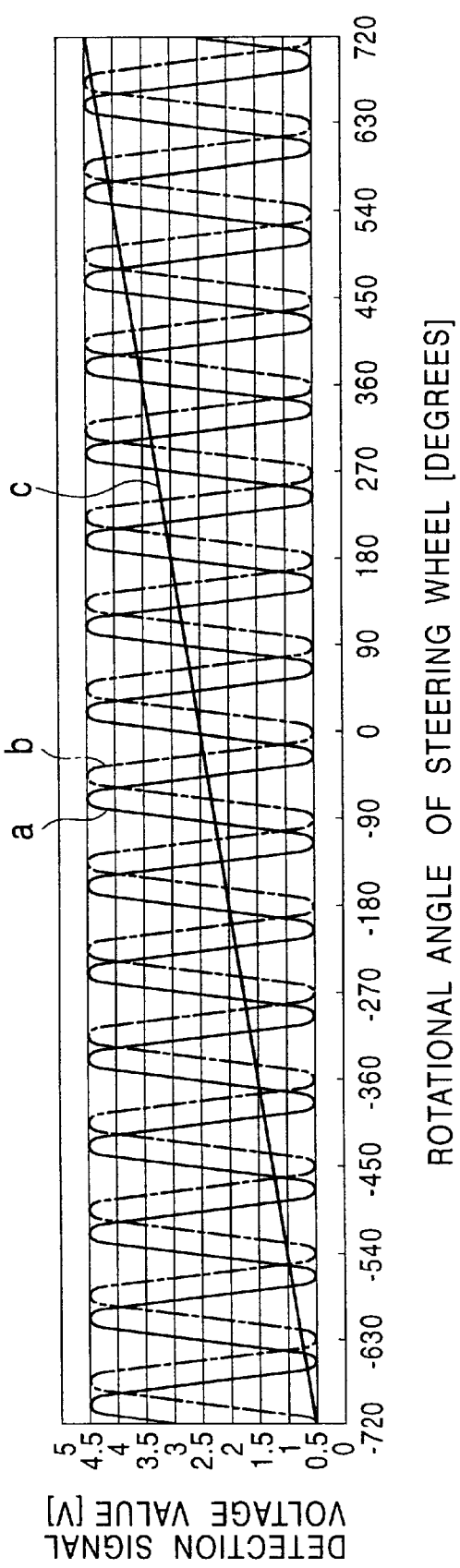
FIG. 3 is a signal waveform diagram showing the detection signals output from the rotary sensor shown in FIGS. 2A and 2B when an automotive steering wheel is rotated.
Figure 4:
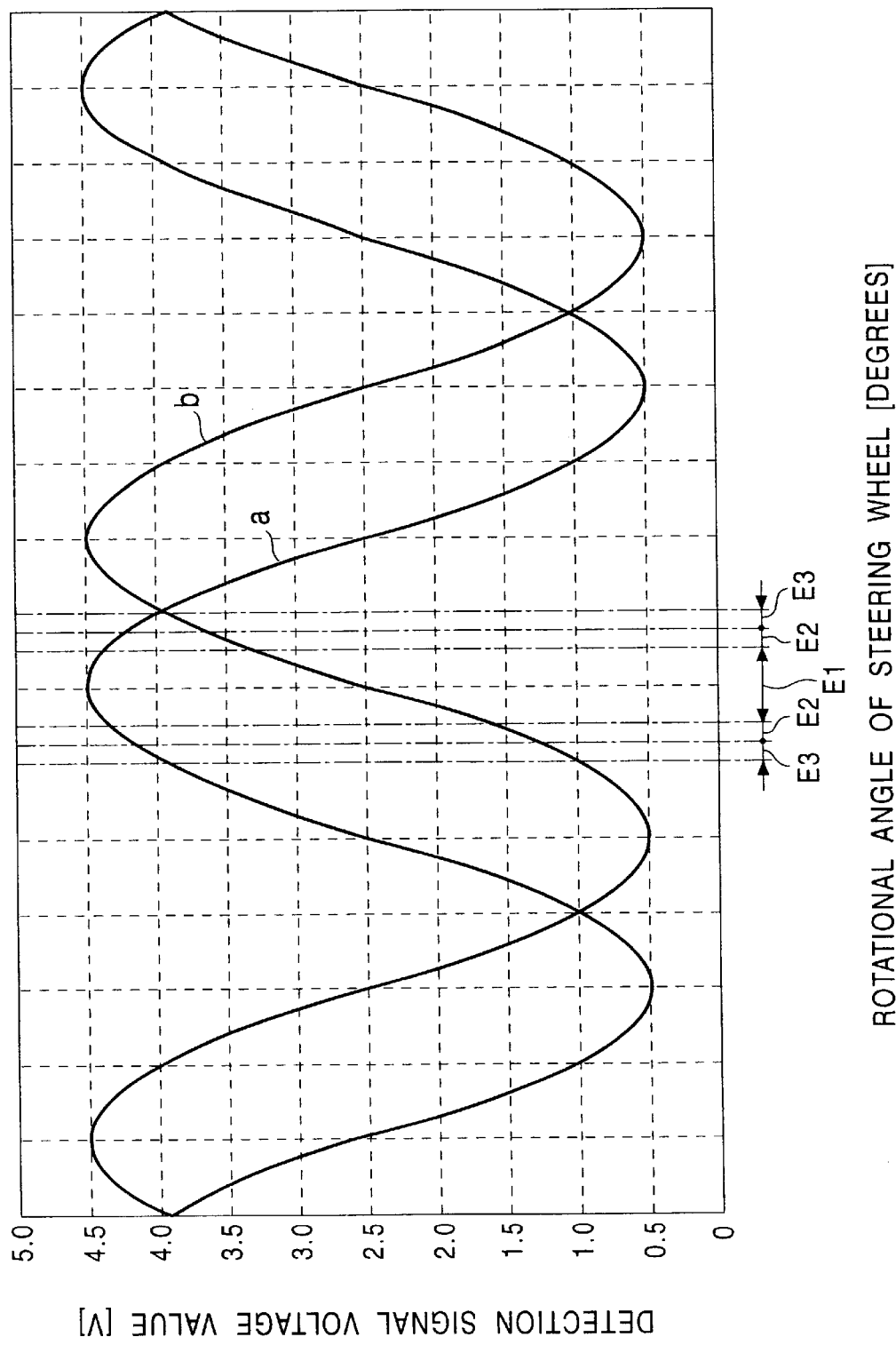
FIG. 4 is an enlarged signal waveform diagram illustrating first through third areas shown in the signal waveform diagram of FIG. 3.

FIG. 3 is a signal waveform diagram showing the first through third detection signals output from the rotary sensor shown in FIGS. 2A and 2B when the automotive steering wheel is turned. FIG. 4 is an enlarged view of signal waveforms illustrating the first through third areas shown in FIG. 3.

In FIG. 3 and FIG. 4, the axis of abscissa indicates the rotational angles of the steering wheel, and the axis of ordinates indicates the voltage values or amplitudes of detection signals.

Referring now to the block diagrams shown in FIG. 1 and FIGS. 2A and 2B, and the signal waveform diagrams shown in FIG. 3 and FIG. 4, the operation of the rotational angle detecting apparatus according to the embodiment will be described.

When the automotive steering wheel is turned, and the steering shaft coupled to the steering wheel is turned, the rotor 8 in which the steering shaft is inserted rotates in the rotation detector 1. The rotation of the rotor 8 causes the worm gear 11 meshed with the worm 8B of the rotor 8 and the rotating shaft 9 on which the worm gear 11 is mounted to simultaneously rotate. The rotation of the worm gear 11 causes the magnet holder 11A coupled to the worm gear 11 and the first magnet $13_1$ mounted on the magnet holder 11A to simultaneously rotate. Then, as the first magnet $13_1$ rotates, the distance between the north and south poles of the first magnet $13_1$ and the first Hall element $14_1$ and the second Hall element $14_2$ installed in the vicinity of the first magnet $13_1$ periodically changes. The first Hall element $14_1$ and the second Hall element $14_2$ output a first detection signal a and a second detection signal b having the same amplitude and the same cycle, and a phase difference of a quarter wavelength, as shown in FIG. 3. Similarly, as the rotating shaft 9 rotates, the sliding member 12 having its thread groove meshed with the rotating shaft 9 slides in the axial direction of the rotating shaft 9, and the second magnet $13_2$ mounted on the sliding member 12 also slides in the axial direction of the rotating shaft 9. As the second magnet $13_2$ slides, the distance between the north and south poles of the second magnet $13_2$ and the third Hall element $14_3$ changes. Thus, the third Hall element $14_3$ outputs a third detection signal c that linearly increases or decreases as the rotational angle of the steering wheel changes, as shown in FIG. 3. The first detection signal a, the second detection signal b, and the third detection signal c issued from the rotation detector 1 are supplied to the control unit 2.

In this embodiment, the first detection signal a and the second detection signal b issued from the rotation detector 1 have a peek-to-peek amplitude of 4.0 V, a cycle of 90 degrees in terms of the rotational angle of the steering wheel, and a phase difference of a quarter wavelength or 22.5 degrees in terms of the rotational angle of the steering wheel, as shown in FIG. 3. The third detection signal c also issued from the rotation detector 1 has a minimum amplitude value of 0.5 V and a maximum amplitude value of 4.5 V, and a cycle of 1440 degrees in terms of the rotational angle of the steering wheel, as shown in FIG. 3. In this case, the amplitude is defined as a value obtained by subtracting the average values of the maximum values and the minimum values of the output voltage values of the first detection signal a and the second detection signal b, respectively, from the output voltage values of the first detection signal and the second detection signal, respectively.

Incidentally, the automotive steering wheel can be usually turned about twice (rotational angle: approximately +720 degrees) in one direction (clockwise) and also about twice, (rotational angle: approximately −720 degrees) in the other direction (counterclockwise) from a neutral position (rotational angle: 0 degrees). To detect the rotational angles of the steering wheel or the steering shaft by the rotation detector 1, a rotational angle range of +720 degrees when the neutral position is used as the reference, and a rotational angle range of 1440 degrees in total. In this case, the rotation detector 1 has the foregoing first detection signal a, the second detection signal b, and the third detection signal c for the overall rotational angle range of 1440 degrees of the steering wheel, enabling the rotation detector 1 to cover all rotational angles of a standard steering wheel.

The first detection signal a, the second detection signal b, and the third detection signal c issued from the rotation detector 1 are supplied to the control unit 2.

The control unit 2 transfers the supplied first detection signal a, the second detection signal b, and the third detection signal c to the memory 3 to overwrite the first detection signal a, the second detection signal b, and the third detection signal c that have already been stored in the memory 3 with the updated first detection signal a, second detection signal b, and third detection signal c, thereby updating the stored information of the memory 3 with the new first detection signal a, the second detection signal b, and the third detection signal c.

Furthermore, the control unit 2 employs the most up-to-date first detection signal a, the second detection signal b, and the third detection signal c to detect the rotational direction, the coarse rotational angle, and the fine rotational angle of the steering wheel. In this case, the detection of the rotational direction and the coarse. rotational angle from the neutral position (the rotational angle: zero degrees) of the steering wheel carried out by using the third detection signal c in the control unit 2 is the same as the detection of the rotational direction of the steering wheel and the detection of the coarse rotational angle from the neutral position in the conventional rotary sensor, which has been described in conjunction with the characteristic chart shown in FIG. 7. Hence, no further description will be given of the detection of the rotational direction and the coarse rotational angle according to the embodiment.

The detection of the fine rotational angle of the steering wheel performed by using the first detection signal a and the second detection signal b in the control unit 2 is basically the same as the detection of the fine rotational angle of the steering wheel in the conventional rotary sensor, which has been described in conjunction with the characteristic diagram shown in FIG. 7 except for the following aspect. To detect a fine rotational angle, the amplitude of the first detection signal a or the amplitude of the second detection signal b is not directly used. Instead, an amplitude is used that has been averaged by weighting the amplitude of the first detection signal a and the amplitude of the second detection signal b by using predetermined coefficients according to the first through third areas determined by the amplitudes of the associated detection signals, as will be discussed hereinafter.

More specifically, the control unit 2 defines three areas as follows: based on the amplitude of one of the first detection signal a and the second detection signal b, that is, the second detection signal b in this embodiment, an area in which the amplitude of the second detection signal b lies in the range of the one-sixth cycle before and after the point at which the second detection signal b reaches the mid amplitude (voltage value: 2.5 V) is defined as a first area E1, an area in which the amplitude of the second detection signal b lies outside the first area E1 and lies within the range of one-twelfth cycle of the second detection signal b is defined as a second area E2, and an area in which the amplitude of the second detection signal b lies outside the second area E2 and lies within the range of one-twelfth cycle of the second detection signal b is defined as a third area E3, as shown in FIG. 4.

If the control unit 2 detects that the amplitude of the second detection signal b lies in the first area E1, then the control unit 2 reads the second detection signal b from the memory 3, and determines a computational angle on the basis of only the read second detection signal b. If the control unit 2 detects that the second detection signal b lies in the second area E2, then the control unit 2 reads: the first detection signal a and the second detection signal b from the memory 3, and determines an averaged computational angle so that the computational angle of the read second detection signal b is 7 in relation to the computation angle of the read first detection signal a, which is 3. Furthermore, if the control unit 2 detects that the computational angle of the second detection signal b lies in the third area E3, then the control unit 2 reads the first detection signal a and the second detection signal b from the memory 3, and determines an averaged amplitude so that the computational angle of the read second detection signal b is 5 in relation to the computation angle of the read first detection signal a, which is 5.

Thus, the control unit 2 detects the fine rotational angle of the steering wheel in the first area E1 through the third area E3 by using the computational angles determined for the first area E1 through the third area E3, respectively.

Thereafter, based on the detected rotational direction, coarse rotational angle, and fine rotational angle of the steering wheel, the control unit 2 creates detection information indicating the rotational direction and the rotational angle with respect to the neutral position of the steering wheel, and supplies the detection information to the controller 4 via the LAN bus line 6.

Based on the supplied detection information, the controller 4 decides on and detailedly carries out the control of the controlled device 5, e.g., an automotive suspension, or the control of an automatic transmission.

In this embodiment, the example has been described in which the first area E1, the second area E2, and the-third area E3 are defined on the basis of the amplitude of the second detection signal b. Alternatively, however, the first area E1 through the third area E3 may be defined on the basis of the amplitude of the first detection signal a. However, if the amplitude of the first detection signal a is used, then the weighting coefficients applied to the amplitudes of the first detection signal a and the second detection signal b, respectively, will be reversed from those in the case described above, to determine the averaged computational angles in the first area E1 through the third area E3.

Thus, according to the embodiment, to detect the fine rotational angle of the steering wheel by the control unit 2, the first area E1 through the third area E3 are defined for the amplitudes of the second or first detection signal. The fine rotational angle of the steering wheel is detected by employing the averaged computational angle obtained by imparting predetermined weighting coefficients to the computational angle of the second or first detection signal and the computational angle of the first or second detection signal when the second or first detection signal lies in the first area E1 through the third area E3. Therefore, even if the linear slope portion of the second or the first detection signal or the linear slope portion of the first or the second detection signal includes a small rotational angle detection error, the rotational angle detection value can be obtained with less influence of the rotational angle detection error.

In the embodiment discussed above, to weight the amplitude of the first detection signal a and the amplitude of the second detection signal b, the first area E1, the second area E2, and the third area E3 are defined on the basis of the amplitude of one of the above detection signals, and the weighting coefficients are set for the first area E1 through the third area E3. In another embodiment, however, the weighting coefficients may be set and determined on the basis of the tilt or slope in terms of differential values of the amplitudes of the first detection signal a and the second detection signal b, as it will be discussed hereinafter.

Figure 5:
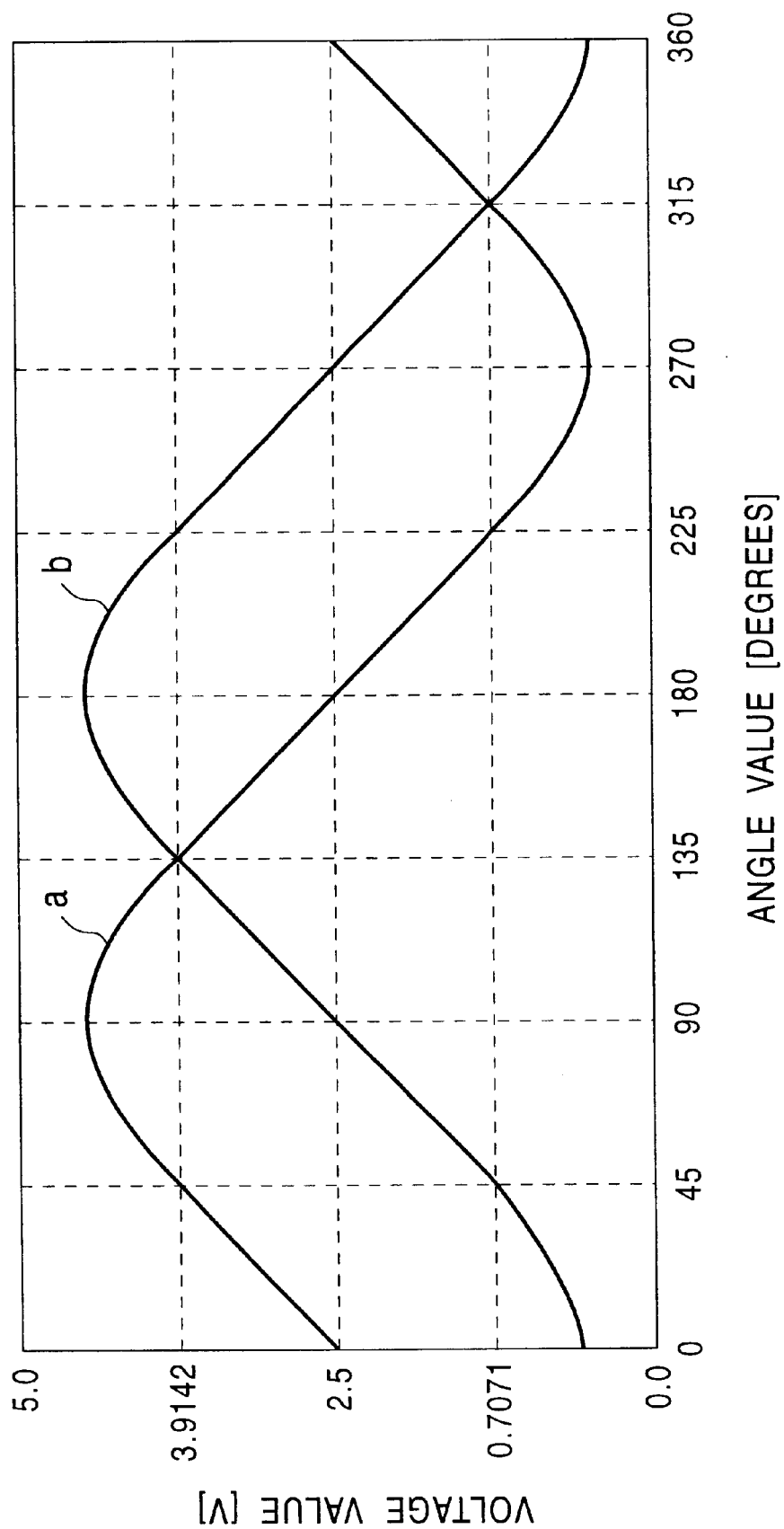
FIG. 5 is an enlarged signal waveform diagram showing an enlarged view of the angle area equivalent to one cycle of each of a first detection signal and a second detection signal.

FIG. 5 is an enlarged signal waveform diagram showing an enlarged view of the angle areas (360 degrees) equivalent to one cycle of each of the first detection signal and the second detection signal.

Referring to FIG. 5, the axis of ordinates indicates the amplitude or voltage value in volts (V), and the axis of abscissa indicates the angle value in degrees. Reference character a denotes the first detection signal (a sine wave signal), and reference character b denotes the second detection signal (a cosine wave signal).

FIG. 6 is a characteristic diagram showing a table of the amplitudes in terms of voltage values, angle values, and tilts in terms of differential values of the first detection signal a and the second detection signal b in the angle areas shown in FIG. 5.

In FIG. 6, the numeral columns on the left side indicate the amplitudes (in voltage values), the angle values, and tilts (in differential values) of the first detection signal (the sine wave signal) a, while the numeral columns on the right side indicate the amplitudes (in voltage values), the angle values, and tilts (in differential values) of the second detection signal (the sine wave signal) b.

As shown in FIG. 5 and FIG. 6, the zero-degree angle value is obtained at a voltage value of 2.5 V in the first detection signal a, while the zero-degree angle value is obtained at a voltage value of 0.5 V in the second detection signal b. As is obvious from FIG. 6, when the voltage value of the second detection signal b is 0.5 V, a 2.5-degree angle shift results even if a voltage value shift is only 0.0019 V. In the case of the first detection signal a, the 2.5-degree angle shift requires a voltage value shift of 0.0872 V. Thus, the first detection signal a and the second detection signal b have different angle shifts with respect to the shifts in voltage value. Preferably, therefore, the detection signal having a smaller angle shift with respect to the shift in voltage value is used to detect an angle. For this purpose, the first detection signal a and the second detection signal b must be replaced in turn to perform angle detection.

However, the angle detection is carried out by replacing the first detection signal a and the second detection signal b, if an error is included in an angle detection value based on the first detection signal a and/or an angle detection value based on the second detection signal b at a replacing point, then a discontinuous angle detection value is obtained at a replacing point, thus preventing an accurate angle detection value from being obtained.

To avoid the aforesaid problem, in this embodiment, the tilts of the first detection signal a and the second detection signal b are computed, and the weighting coefficients for the first detection signal a and the second detection signal b are determined on the basis of the computed tilt values so as to eliminate the discontinuity in the angle detection values at a replacing point.

More specifically, if the angle value computed based on the voltage value of the first detection signal a is denoted as $\theta A$, the tilt is denoted as $\Delta A$, the angle value computed based on the voltage value of the second detection signal b is denoted as $\theta B$, and the tilt is denoted as $\Delta B$, then the angle to be determined that is denoted as $\theta$ can be obtained by the expression given below:

$$\theta = \theta A \times \Delta A/(\Delta A+\Delta B) + \theta B \times \Delta B/(\Delta A+\Delta B)$$

To be more specific, as shown by the line of numerals indicated by one circle in FIG. 6, when the voltage value of the first detection signal a is 2.5 V, angle value $\theta A$ is zero degrees, and tilt $\Delta A$ is 1.0000. Furthermore, when the voltage value of the second detection signal b is 0.5 V, the angle value $\theta B$ is zero degrees, and tilt $\Delta B$ is 0.0000; therefore:

$$\theta = 0 \times 1/(1+0) + 0 \times 0/(1+0)$$

Thus, tilt $\Delta A$ of the first detection signal a is large, and the angle shift thereof in relation to the variations in voltage value is small, while tilt $\Delta B$ of the second detection signal b is small, and the angle shift in relation to the variations in voltage value is large. Based on the results, the weighting coefficient of the first detection signal a will be 1, and the weighting coefficient of the second detection signal b will be 0.

Referring back to FIG. 6, as shown by the line of numerals indicated by two circles in the table, when the voltage value of the first detection signal a is 3.9142 V, angle value $\theta A$ is 45.0 degrees, and tilt $\Delta A$ is 0.7071. Furthermore, when the voltage value of the second detection signal b is 1.0858 V, the angle value $\theta B$ is 54.0 degrees, and tilt $\Delta B$ is 0.7071; therefore:

$$\theta = 45 \times 0.7071/(0.7071+0.7071) + 45 \times 0.7071/(0.7071+0.7071)$$

Thus, tilt $\Delta A$ of the first detection signal a is equal to tilt $\Delta B$ of the second detection signal b; hence, the angle shifts in relation to the variations in voltage value will be the same. Based on the results, the weighting coefficient of the first detection signal a will be 0.5, and the weighting coefficient of the second detection signal b will be 0.5.

As shown by the line of numerals indicated by the three circles in FIG. 6, when the voltage value of the first detection signal a is 4.5 V, angle value $\theta A$ is 90.0 degrees, and tilt $\Delta A$ is 0.0000. Furthermore, when the voltage value of the second detection signal b is 2.5 V, the angle value $\theta B$ is 90.0 degrees, and tilt $\Delta B$ is 1.0000; therefore:

$$\theta = 90 \times 0/(0+1) + 90 \times 1/(0+1)$$

Thus, tilt $\Delta A$ of the first detection signal a is small, and the angle shift thereof in relation to the variations in voltage value is large, while tilt $\Delta B$ of the second detection signal b is large, and the angle shift in relation to the variations in voltage value is small. Based on the results, the weighting coefficient of the first detection signal a will be 0, and the weighting coefficient of the second detection signal b will be 1.

Furthermore, the weighting coefficients for the first detection signal a and the second detection signal b can be determined by performing the foregoing computation on each of angle values $\theta A$ and $\theta B$ ranging from 0 degrees to 45.0 degrees and from 45.0 degrees to 90.0 degrees, respectively. Accordingly, the computational angles of the first detection signal a and the second detection signal b can be replaced in a state wherein there is no discontinuity in angle detection values at replacing points.

Thus, according to the present invention, when detecting the fine rotational angles of a rotating member on the basis of the amplitudes of the first detection signal and the second detection signal, the first detection signal and the second detection signal are weighted, and the weighting is changed according to the area of the rotational angle of the rotating member. Therefore, by selecting proper weighting coefficients and rotational angle areas, rotational angle detection values can be obtained with less influences of a rotational angle detection error even if a slight rotational angle detection error is included in the linear slope portion of one detection signal or the other detection signal. This permits a rotational angle detecting apparatus with high accuracy to be achieved.

What is claimed is:

1. A rotational angle detecting apparatus comprising:

a rotor connected to a rotating member;

a rotation detector for successively detecting, as the rotor rotates, a first detection signal and a second detection signal that are each sinusoidal and have a predetermined amplitude, the same cycle, and a phase difference of substantially a quarter wavelength;

a memory for storing the first detection signal and the second detection signal; and a control unit, wherein the control unit changes a weighting of the first detection signal and the second detection signal according to an area of the rotational angle of the rotating member in detecting a fine rotational angle of the rotating member on the basis of amplitudes of the first detection signal and the second detection signal, the weighting being changed such that a weighting coefficient of a detection signal having a higher degree of linearity between the first detection signal and the second detection signal is set to be larger than a weighting coefficient of a detection signal having a lower degree of linearity, wherein a first area preceding and following a point at which one of the first detection signal and the second detection signal reaches its mid amplitude is defined, a second area of the one detection signal outside the first area is defined, and a third area of the one detection signal outside the second area is defined, and wherein the rotational angle of the rotating member is detected on the basis of the amplitude of the one detection signal when the one detection signal is present in the first area, or the amplitude is obtained by averaging the amplitude of the one detection signal and the amplitude of the other detection signal at a first ratio when the one detection signal is present in the second area, or the amplitude is obtained by averaging the amplitude of the one detection signal and the amplitude of the other detection signal at a second ratio when the one detection signal is present in the third area.

2. A rotational angle detecting apparatus according to claim 1, wherein the first area is in a range of one-sixth cycle preceding and following a point at which one of the first detection signal and the second detection signal reaches its mid amplitude, the second area is in a range of one-twelfth cycle of the one detection signal outside the first area, and the third area is in a range of one-twelfth cycle of the one detection signal outside the second area are defined, and the rotational angle of the rotating member is detected on the basis of the amplitude of the one detection signal when the one detection signal is present in the first area, or the amplitude is obtained by averaging the amplitude of the one detection signal and the amplitude of the other detection signal at a ratio of 7 to 3 when the one detection signal is present in the second area, or the amplitude is obtained by averaging the amplitude of the one detection signal and the amplitude of the other detection signal at a ratio of 5 to 5 when the one detection signal is present in the third area.

3. A rotational angle detecting apparatus according to claim 1, wherein the rotating member is an automotive steering shaft, and the first detection signal and the second detection signal detect a steering angle of the steering shaft in cooperation with a third detection signal indicating a coarse rotational angle of the full rotation of the steering shaft.

4. A rotational angle detecting apparatus according to claim 3, wherein the detection signal of the steering angle is supplied to a controller via a local area network bus line provided in a car.

* * * * *